United States Patent
Burden

(10) Patent No.: US 10,501,350 B1
(45) Date of Patent: Dec. 10, 2019

(54) SYSTEM, METHOD AND BIO MEDIA FOR STORMWATER TREATMENT

(71) Applicant: ECOSENSE INTERNATIONAL, INC., Rockledge, FL (US)

(72) Inventor: Randall N. Burden, Palm Bay, FL (US)

(73) Assignee: ECOSENSE INTERNATIONAL, INC., Rockledge, FL (US)

( * ) Notice: Subject to any disclaimer, the term of this patent is extended or adjusted under 35 U.S.C. 154(b) by 0 days.

(21) Appl. No.: 15/493,130

(22) Filed: Apr. 20, 2017

Related U.S. Application Data

(60) Provisional application No. 62/325,065, filed on Apr. 20, 2016.

(51) Int. Cl.

| | |
|---|---|
| *C02F 3/30* | (2006.01) |
| *B01J 20/20* | (2006.01) |
| *B01J 20/24* | (2006.01) |
| *C02F 1/28* | (2006.01) |
| *C02F 3/32* | (2006.01) |
| *B01J 20/16* | (2006.01) |
| *C02F 103/00* | (2006.01) |
| *C02F 101/16* | (2006.01) |

(52) U.S. Cl.
CPC ............ *C02F 3/305* (2013.01); *B01J 20/165* (2013.01); *B01J 20/205* (2013.01); *B01J 20/24* (2013.01); *C02F 1/281* (2013.01); *C02F 1/283* (2013.01); *C02F 3/327* (2013.01); *C02F 2101/163* (2013.01); *C02F 2103/001* (2013.01)

(58) Field of Classification Search
CPC . B01D 21/0012; B01D 2221/12; C02F 1/281; C02F 1/283; C02F 1/285; C02F 1/286; C02F 1/42; C02F 2101/105; C02F 3/305; C02F 3/327; B01J 20/165; B01J 20/24
USPC .................................. 210/170.03, 263, 747.3
See application file for complete search history.

(56) References Cited

U.S. PATENT DOCUMENTS

| | | | |
|---|---|---|---|
| 7,270,747 B2 | 9/2007 | Happel et al. | |
| 7,846,327 B2 | 12/2010 | Happel et al. | |
| 8,496,814 B2 | 7/2013 | Kent | |
| 8,523,965 B2* | 9/2013 | Jones | C10B 57/08 203/47 |
| 9,175,463 B1* | 11/2015 | Stivers | E03F 5/14 |
| 2010/0062933 A1* | 3/2010 | Wanielista | B01J 20/10 502/402 |
| 2013/0316898 A1* | 11/2013 | De Leij | B01J 20/02 502/406 |

(Continued)

OTHER PUBLICATIONS

Simek et al., "What is the So-Called Optimum pH for Denitrification in Soil," Soil Biology and Biochemistry, vol. 34, Issue 9, Sep. 2002, pp. 1227l-1234, Abstract, Retrieved from https://www.sciencedirect.com/science/article/abs/pii/S0038071702000597?via%3Dihub.

(Continued)

*Primary Examiner* — Claire A Norris
(74) *Attorney, Agent, or Firm* — Terry M. Sanks, Esq.; Beusse Wolter Sanks & Maire, PLLC

(57) ABSTRACT

A bio media to remove at least nitrates from collected stormwater is disclosed including natural components to at least facilitate beneficial levels of denitrification and adsorption to remove nitrates and other contaminants passing into the media. Another bio media, systems and a method are also disclosed.

10 Claims, 8 Drawing Sheets

(56) References Cited

U.S. PATENT DOCUMENTS

2015/0230419 A1* 8/2015 Ishizaka ................ A01G 24/00 47/1.01 R

OTHER PUBLICATIONS

Jensen et al., "Technical Report 6: Drinking Water Treatment for Nitrate," Jul. 2012.

* cited by examiner

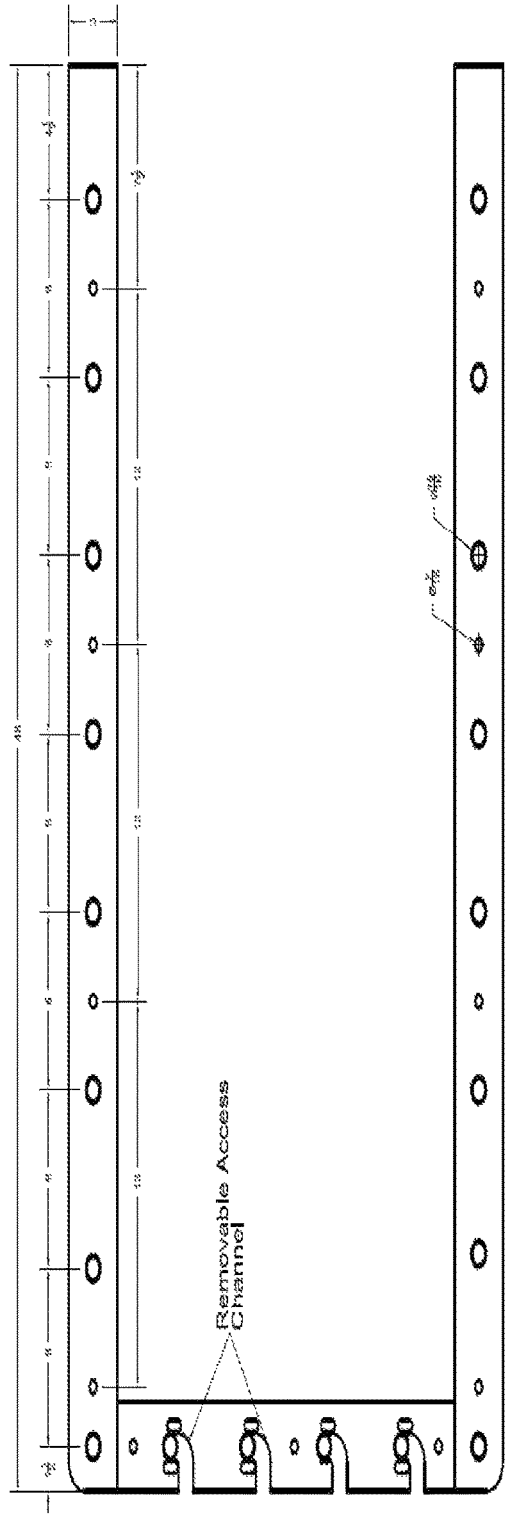

FIG. 2

| MICCO LAB ANALYSIS | DN in Bbin 1/14/16 mg/L | DN out Bbout 1/14/16 mg/L | % Δ | DN in Bbin 3/14/16 mg/L | DN out Bbout 3/14/16 mg/L | % Δ |
|---|---|---|---|---|---|---|
| TSS | 5.0 U | 16 | 220 | 5.0 U | 5.0 U | 0 |
| TN | 1.2 | 0.96 | -20 | 1.1 | 0.87 | -21 |
| Nitrogen, Ammonia | 0.43 | 0.5 | 16 | 0.32 | 0.46 | 44 |
| Total Kjeldahl Nitrogen | 0.87 | 0.78 | -10 | 0.87 | 0.82 L | -6 |
| Nitrogen, Nitrate | 0.29 | 0.094 | -68 | 0.19 | 0.048 I | -75 |
| Nitrogen, Nitrite | 0.039 | 0.083 | 213 | 0.025 | 0.025 I | 0 |
| Nitrogen, NO2+NO3 | 0.29 | 0.18 | -38 | 0.19 | 0.048 I | -75 |
| Orthophosphate as P | 0.099 I | 0.029 | -71 | 0.12 | 0.098 | -18 |
| Total Phosphorus | 0.096 I | 0.050 U | -48 | 0.11 | 0.079 I | -28 |

I - The reported value is between the laboratory method detection limit and the laboratory practical quantitation limit.
U - Compound was analyzed for but not detected

FIG. 3

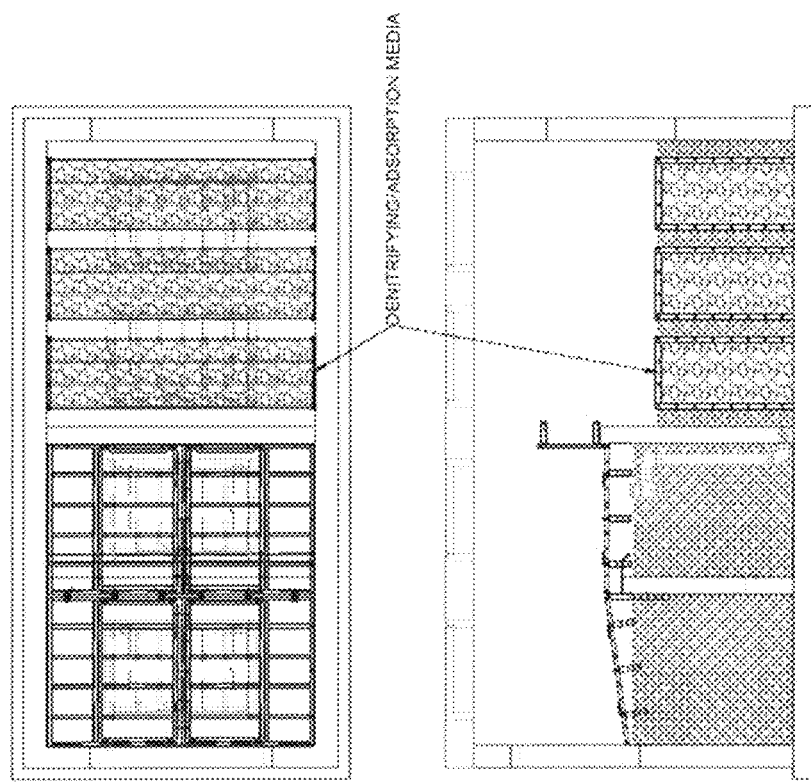
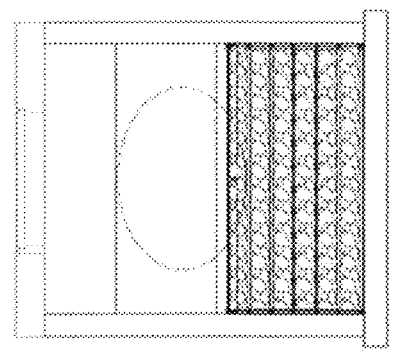
FIG. 5

900 — passing stormwater into a structure an inflow end and an outflow end, wherein the inflow end and the outflow end may be connected at least one of in-line and off-line of the drain 910 — denitrifying the stormwater with a bio media consisting of at least two of a naturally formed or occurring zeolite-like material, a naturally formed based carbon source and a biodegradable carbon source 930 — removing the stormwater from the structure after denitrifying the stormwater

FIG. 9

SYSTEM, METHOD AND BIO MEDIA FOR STORMWATER TREATMENT

CROSS-REFERENCE TO RELATED APPLICATIONS

This application claims the benefit of U.S. Provisional Application No. 62/325,065 filed Apr. 20, 2016, and incorporated herein by reference in its entirety.

BACKGROUND

Embodiments relate to water filtration and, more particularly, to stormwater filtration.

Drain water collected from paved surfaces and other areas typically includes various additional components mixed in with the water, such as, but not limited to, trash, organic matter, human and animal waste, fertilizer, suspended solids, hydrocarbons, metals, oil, nutrients and bacteria which may include ammonia, nitrates, nitrites and phosphorus. These other components may have direct or indirect harmful outcomes for humans and ecosystems. As an example, nitrate may cause liver damage, various forms of cancer, methemoglobinemia (oxygen deficiency in an infant's body). Furthermore, excess phosphorus and nitrogen may cause algal blooms and eutrophication in lakes and estuaries.

Stormwater treatment structures are known in the art for removing sediments, trash, organics, nutrients, metals, oils and grease from drain water. However, an amount of sediments, trash, organics, nutrients, metals, oils and grease that are removed vary based on the design of the respective structure. Generally, structures have been developed which focus on a particular contaminant or several contaminants, but not what are recognized as some of the most harmful contaminants, such as nitrates, where a high level of the plurality of contaminants are removed. Thus, builders and users of stormwater filtration systems would benefit from a system and method that removes a high concentration of such contaminants as nitrate while also removing trash, organic matter, human and animal waste, fertilizer, suspended solids, and the like.

SUMMARY

Embodiments related to a system, method and bio media for stormwater filtration. The bio media to remove at least nitrates from collected stormwater consists at least a naturally formed or occurring zeolite-like material; a naturally formed or occurring carbon sources; and a biodegradable carbon source, the naturally formed zeolite-like material selected from a group consisting of red lava rock and zeolite, the naturally formed carbon source selected from a group consisting of lump coal and biochar, and the biodegradable carbon source selected from a group consisting of corn cobs, alfalfa based straw and wheat based straw.

In another embodiment, the bio media to remove at least nitrates from collected stormwater comprises natural components to at least facilitate beneficial levels of denitrification and adsorption to remove nitrates and other contaminants passing into the media.

The system is a baffle box drain system located within a flow stream of a drain. The system comprises a structure that comprises an inflow end and an outflow end, wherein the inflow end and the outflow end may be connected at least one of in-line and off-line of the drain. The structure also comprises a plurality of separation chamber compartments terminating at a base within the structure and an open end at a part of each compartment above the base. A denitrification subsystem is also provided, located within at least one of the plurality of separation chamber compartments, the denitrification subsystem comprises a bio media consisting of at least a naturally formed or occurring zeolite-like material, a naturally formed based carbon source and a biodegradable carbon source, wherein the naturally formed zeolite-like material is selected from a group consisting of zeolite and red lava rock, wherein the naturally formed carbon source is selected from a group consisting of lump coal and biochar, and wherein the biodegradable carbon source is selected from a group consisting of corn cobs, alfalfa based straw and wheat based straw.

A stormwater drainage system is also provided, comprising an area into which stormwater passes and a bio media to provide for denitrification of debris within the stormwater, the bio media comprising at least two of a naturally formed or occurring zeolite-like material, a naturally formed based carbon source and a biodegradable carbon source.

The method comprises passing stormwater into a structure an inflow end and an outflow end, wherein the inflow end and the outflow end may be connected at least one of in-line and off-line of the drain. The method also comprises denitrifying the stormwater with a bio media consisting of at least two of a naturally formed or occurring zeolite-like material, a naturally formed based carbon source and a biodegradable carbon source.

BRIEF DESCRIPTION OF THE DRAWINGS

A more particular description briefly stated above will be rendered by reference to specific embodiments thereof that are illustrated in the appended drawings. Understanding that these drawings depict only typical embodiments and are not therefore to be considered to be limiting of its scope, the embodiments will be described and explained with additional specificity and detail through the use of the accompanying drawings in which:

FIG. 2 shows a front view of a holding structure to retain a bag comprising denitrification and adsorption media;

FIG. 3 shows an example of test results utilizing an embodiment of the media disclosed herein;

FIG. 5 shows a side view, plan view, and back view of another embodiment of a stormwater treatment structure comprising a denitrification component;

FIG. 9 shows a flowchart of an embodiment of a method.

DETAILED DESCRIPTION

Figure 1:
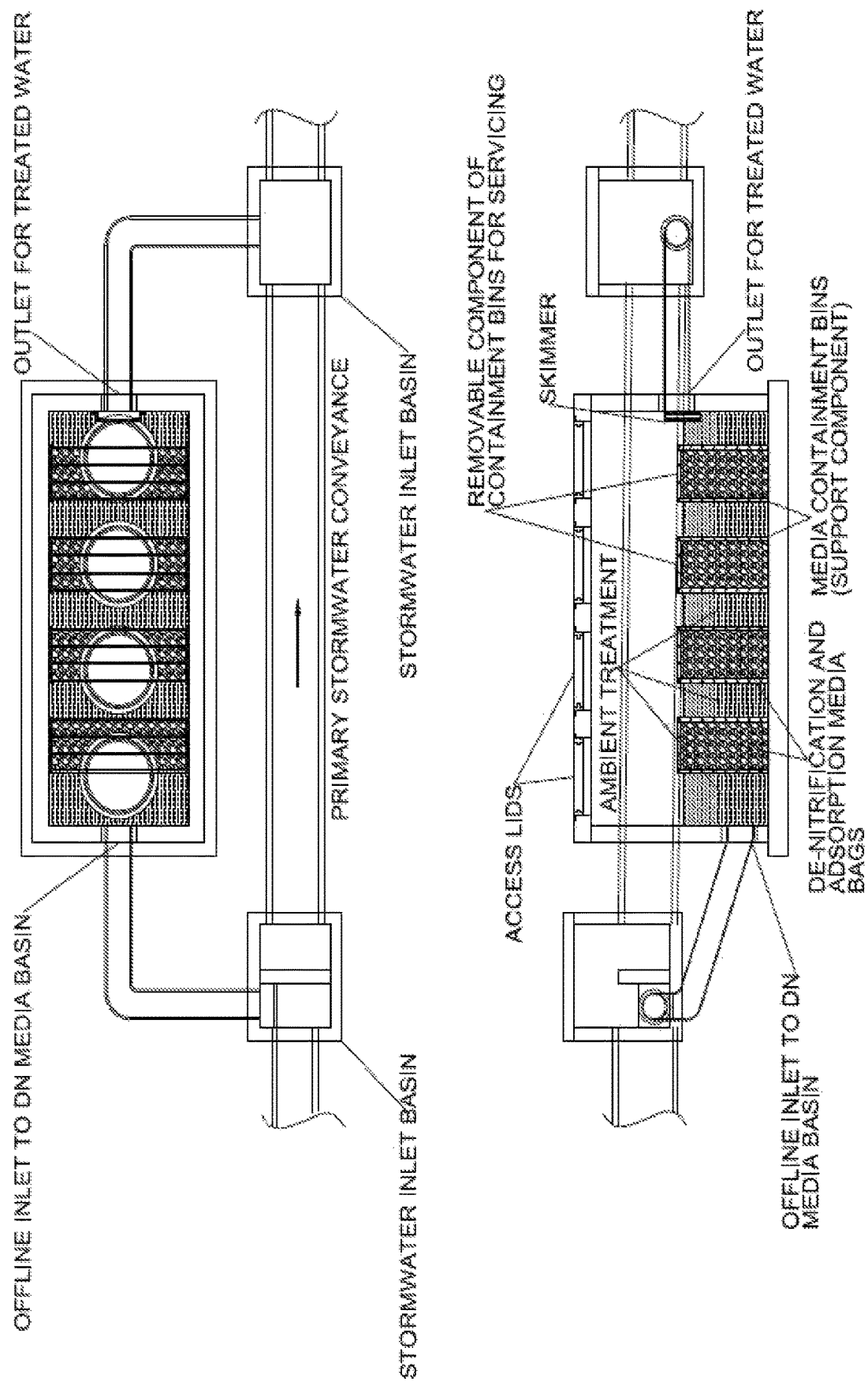
FIG. 1 shows a side and plan view of a denitrification stormwater treatment structure.

Embodiments are described herein with reference to the attached figures wherein like reference numerals are used throughout the figures to designate similar or equivalent elements. The figures are not drawn to scale and they are provided merely to illustrate aspects disclosed herein. Several disclosed aspects are described below with reference to non-limiting example applications for illustration. It should be understood that numerous specific details, relationships, and methods are set forth to provide a full understanding of the embodiments disclosed herein. One having ordinary skill in the relevant art, however, will readily recognize that the disclosed embodiments can be practiced without one or more of the specific details or with other methods. In other instances, well-known structures or operations are not shown in detail to avoid obscuring aspects disclosed herein. The embodiments are not limited by the illustrated ordering of acts or events, as some acts may occur in different orders and/or concurrently with other acts or events. Furthermore, not all illustrated acts or events are required to implement a methodology in accordance with the embodiments.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

FIG. 1 shows a side and plan view of a denitrification stormwater treatment structure. The structure, a denitrification (DN) structure or box, may be a rectangular box that is located within a flow stream of a drain with water entering the box through an inflow end and exiting the box, or structure, by way of an outflow end. A plurality of bags containing media, as disclosed herein, is provided within the structure. Though a plurality of bags is shown, a single bag may be used. Bags are used to hold a media to provide for denitrification and adsorption. Though a bag is disclosed, other holding components or structures may be used. As a non-limiting example, a porous container or structure may be located within the structure into which the media may be placed. As a non-limiting example, the container may be made of a polypropylene material. Thus, the use of the terms "bag" or "bags" is not meant to be limiting as any component that allows liquid to pass into the component and which can hold a media may encompass these terms.

Stormwater is directed towards a base of the media and flows upward, through the media until it reaches an outlet which is at a higher elevation than where the inlet flow of the stormwater initially reaches the media. However, those skilled in the art recognize that inlet and outlet elevations may vary according to specific site conditions.

A support component is provided within the structure to maintain the bag in place. Securing or maintaining the bag in place is not a limiting requirement. In another non-limiting embodiment, the bag may be provided to move freely or along a controlled path within the structure where movement is determined by a flow of water entering the structure.

FIG. 2 shows a front view of the support structure to retain the bag. As discussed above, the support structure may secure the bag in place or may hold a denitrification and adsorptions media directly within the support structure. The support structure provides for water to pass through the structure. More specifically, water will enter the structure, travel horizontally towards an exit within the structure. The support structure provides for openings for the water to travel into the structure, through the media and past the media. The water may then continue towards the exit. The support structure comprises an access panel. As illustrated, the access panel may include a channel through which a securing rod passes and is then locked in place once it reaches an inner locking location within the channel.

Over time, the media may need to be replaced to ensure that the media is able to maintain denitrification and adsorption at a desired level. A top part of the structure may be configured to be removed so that the media, when not within the bag or is in the bag, is able to be removed. The media or bag may be replaced. In another non-limiting example, the media or bag may be cleaned then reinserted into the structure. Thus, the media is not necessarily required to be within an enclosed bag. The bag may have an open end. In another embodiment, less pliable structure may be used to hold the media. This less pliable structure may have an open end.

The media may be biological active wherein it provides a location, namely, a surface and a carbon source for microbes to perform a process, such as in this case, to perform nitrification and denitrification. Nitrification involves converting ammonia to nitrate. Denitrification uses the nitrate to covert and reduce the bi-product to nitrogen gas, $N_2$.

The media is comprised of natural components to at least facilitate beneficial levels of denitrification and adsorption to remove nitrates and other contaminants passing into the media. The media may comprise at least one of a zeolite material and red lava rocks in addition to at least two carbon sources where one is naturally biodegradable. Both the zeolite material and red lava rock provide a framework with cavities and channels inside where cations, water and/or small molecules may reside. Red lava rock and a zeolite material are a ballast that has a high surface area. The type of zeolite being used may be a gravel-like material. The zeolite material may adsorb an amount of ammonia passing into the zeolite material to allow for nitrification bacteria to consume and convert the ammonia to nitrate, thus making nitrate available for denitrification bacteria. The amount may depend on a concentration of ammonia at an inflow and/or at bed contact time.

Lava rocks and zeolite material may also comprise iron which may precipitate micro nutrients and phosphates. The first carbon source may comprise at least one of charcoal. The second carbon biodegradable component may comprise corn cobs, straw or hay, coconut fibers. The straw or hay may comprise at least one of dried wheat plants and dried alfalfa plants. Through testing, corn cobs have shown to provide the best denitrification results. Non-limiting examples of charcoal which may be used includes lump charcoal or bio-charcoal.

In an embodiment, the media comprises corn cob, lump charcoal, and red lava rock in equal amounts by volume. This composition of the media provides for a coarse medial, comprising about 0.5 to 1-inch chunks, with a low hydraulic impedance.

Finer chunks are also usable. As a non-limiting example, a natural zeolite may be used, such as, but not limited to, ¼-½" gravel. One type of such a zeolite may be clinoptilolite. Clinoptilolite is a natural zeolite comprising a microporous arrangement of silica and alumina tetrahedra. It has the complex formula: $(Na,K,Ca)_{2-3}Al_3(Al,Si)_2Si_{13}O_{0.36} \cdot 12H_2O$. It forms as white to reddish tabular monoclinic tectosilicate crystals with a Mohs hardness of 3.5 to 4 and a specific gravity of 2.1 to 2.2. This may be used in place of the red lava rock. However, as used herein zeolite-like material may include zeolite or red lava rock.

Another carbon source which may be used is biochar, which may be, but is not limited to, ¼×½ to ¼×1" chips. Biochar may be a long-term carbon source and adsorption media analogous to activated carbon. "Long-term" is used herein to mean that it will take many years for it to be used up by microbial activity.

The second biodegradable bio-source may still remain as corn cob, at approximately ½" to ¾" chunks which provide for a short-term and high efficiency carbon source. Corn cob appears to be the most efficient carbon source for denitrification. When using corn cob, the denitrification process produces lower levels of nitrous oxide than other carbon sources, which is better for the environment.

The coarseness or fineness of the media may be varied. As a non-limiting example, the corn cob may be crushed or hammer milled to approximately ½ inch chunks, plus or minus a half inch.

Composition of the media by volume may consist of approximately 30% to 40% zeolite-like material, approximately 30% to 40% carbon source, and approximately 30 to 40% biodegradable carbon source, where "approximately" means that each may vary up to 5%. The ratio of these components may vary and be adjusted to maximize performance under various operation conditions.

FIG. 3 shows an example of test results utilizing an embodiment of the media disclosed herein. These results were based on a media that comprised red lava rock, corn cob and lump charcoal. The material tested included the following: total suspended solids (TSS); total nitrogen (TN); nitrogen, ammonia; total kjeldahl nitrogen; nitrogen, nitrate; nitrogen, nitrite; nitrogen, $NO_2$ and $NO_3$; Orthosphosphate (P); and total phosphorus. The first column, $DN_{in}$ shows the reading of the above contaminants, in mg/L, at the before entering the media and the next column shows the readings after passing through the media. The next column shows the differences realized after passing through the media. The fifth through seventh columns are another set of test results utilizing the same media composition.

Figure 4:
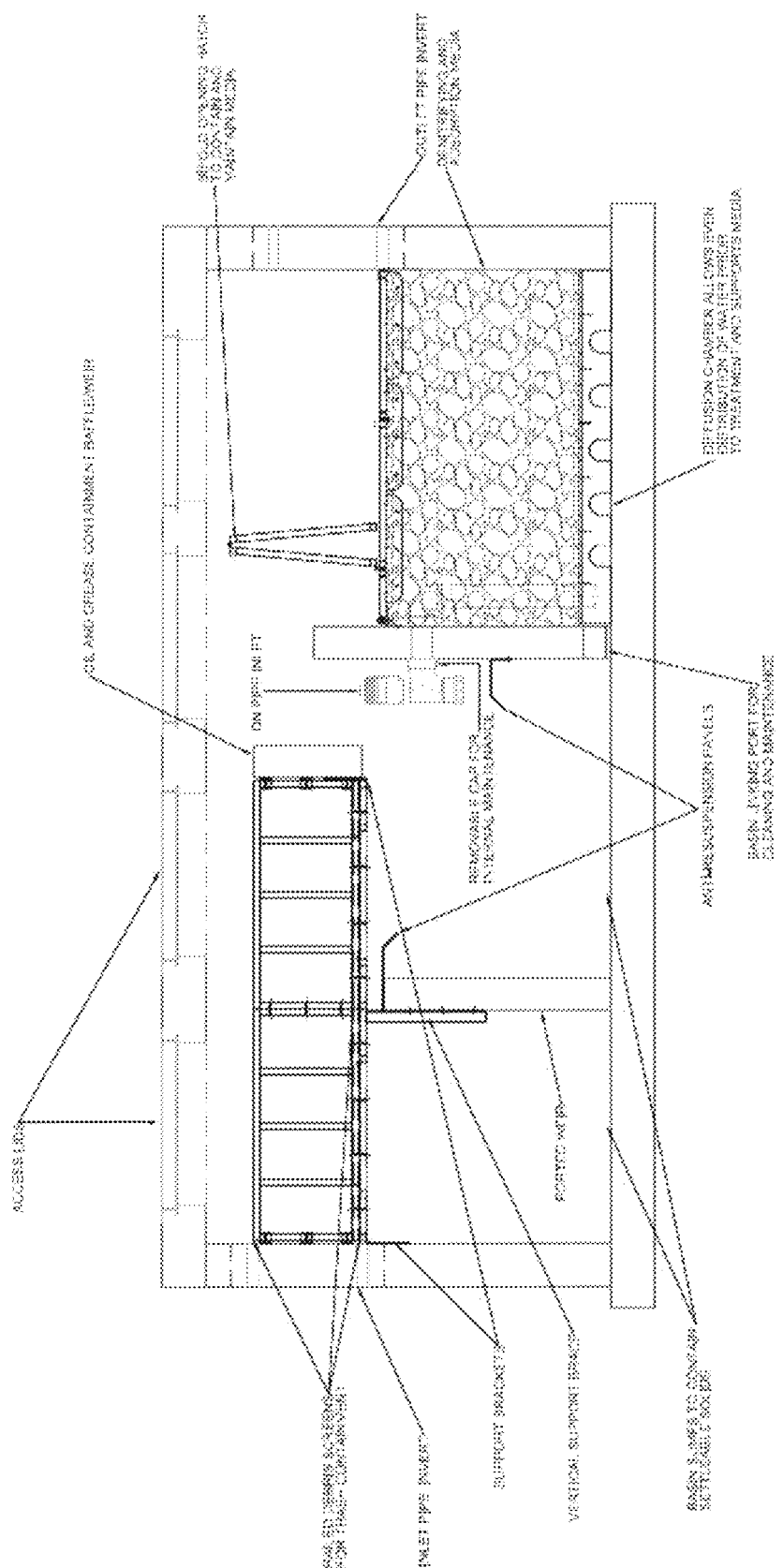
FIG. 4 shows a side view of an embodiment of a stormwater treatment structure comprising a denitrification component.

FIG. 4 shows a side view of another embodiment of a stormwater treatment structure comprising a denitrification component. As shown, a containment area to capture debris is located at an elevation of the inlet. The containment area is located upon a weir that defines a first chamber and a second chamber. The containment area terminates at a second weir located at an elevation proximate the elevation of the inlet. Sediment that passes through the containment area collects within the first chamber.

A pressure control port is provided through the first weir to provide for access and flow of water from the first chamber to the second chamber generally to disperse incoming, sediment laden water between the first two chambers and dissipate energy. Within the second chamber at least one anti resuspension panel is located. The at least one anti-resuspension panel is used to control a flow of water in which sediment remains within the second chamber. Thus, within or above the second chamber the at least one baffle/weir may intercept the incoming flow to absorb energy and contain floating contaminants such as fine debris and floating oils and grease.

A third weir defines a third chamber separate from the second chamber. An opening is provided in the third weir through which a pipe may be located. A water flow controller is provided to allow for water to pass from the second chamber to the third chamber. Though a pipe is illustrated, a pipe is not necessary. When a pipe is used, it may be used to direct water through the third weir and downward to a bottom location. The bottom location may be a diffusion chamber. The diffusion chamber may provide for water being evenly distributed throughout the bottom location.

Above the diffusion chamber in the chamber is the media, as discussed above. The water flows upward through the media and then out through the outlet. Over the third chamber is a hatch opening, such as, but not limited to, a bi-fold hatch opening may be provided. The hatch opening may be used to remove and replace the media, as needed.

FIG. 5 shows a side view, plan view, and back view of yet another embodiment of a stormwater treatment structure comprising a denitrification component. The structure may be divided into a plurality of separation chamber compartments, such as, but not limited to, three as illustrated. No tops are provided over the compartments so that each compartment is open for access. As shown, the denitrification components described above may be included at least one of the compartments. As illustrated in FIG. 5, the denitrification components are shown in the third chamber, or the chamber adjacent to a wall housing the exit end. The water is passed through an opening so that the water will flow upward through the media. In another example, the opening may be located to provide for the stormwater flowing horizontally through the media.

Drain water may enter the structure at the inflow end, which is at least predominantly located above the chambers, and flows over the tops of the plurality of compartments, primarily the compartments that do not house the denitrification components. Sediment and solid pollutants may be trapped in the compartments not housing the denitrification components, which may then be later removed. A screen may be provided above the compartments that do not house the denitrification components to further capture floating debris. As shown, the screen is stationary.

In the embodiment disclosed in FIGS. 4 and 5, water fills the first two compartments. To enter the denitrification component, water must pass through an opening or at least one pipe which passes the water into a bottom of the third chamber.

Figure 6:
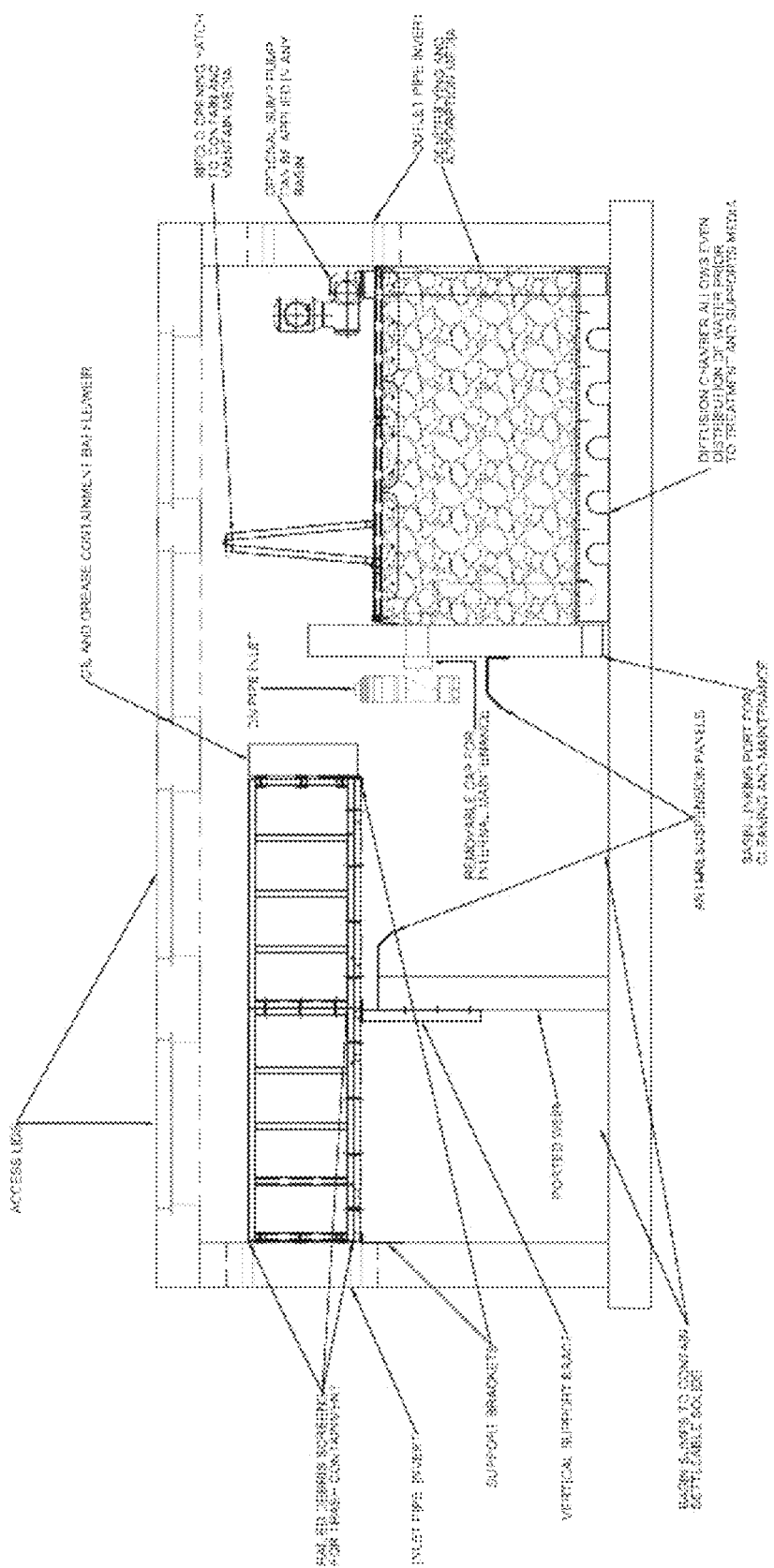
FIG. 6 shows a side view of a stormwater treatment structure with a sump pump.

FIG. 6 shows a side view of a stormwater treatment structure with a sump pump. An embodiment of the stormwater treatment structure, as illustrated in either FIG. 4 or FIG. 5, may be used. In another non-limiting embodiment, a stormwater treatment structure without the media may also be used. Within the third chamber, or when more or fewer chambers are included, the chamber that is closest the outlet, a sump pump, or a pump system used to remove water that has accumulated in a water collecting basin, is provided. The pump may be powered by way of a solar collecting system that provides for the solar collectors being located above ground (not shown), but which is electrically connected to the pump. Though solar power is discussed, other power sources may also be used. Thus, even when a sufficient amount of water is not within the stormwater treatment structure to cause the water to continue to flow from the inlet to the outlet, the sump pump may be used to provide a constant flow of collected water located within the stormwater treatment structure out of the stormwater treatment structure. As a non-limiting example, the pump may be used to reduce water volume inside the structure prior to cleaning the sediments or other service. Thus, the pump may allow for any static upstream water to be removed at a slow filtered rate. In operation during cleaning the structure, less time and effort may be realized by the vacuum truck and crew.

Figure 7:
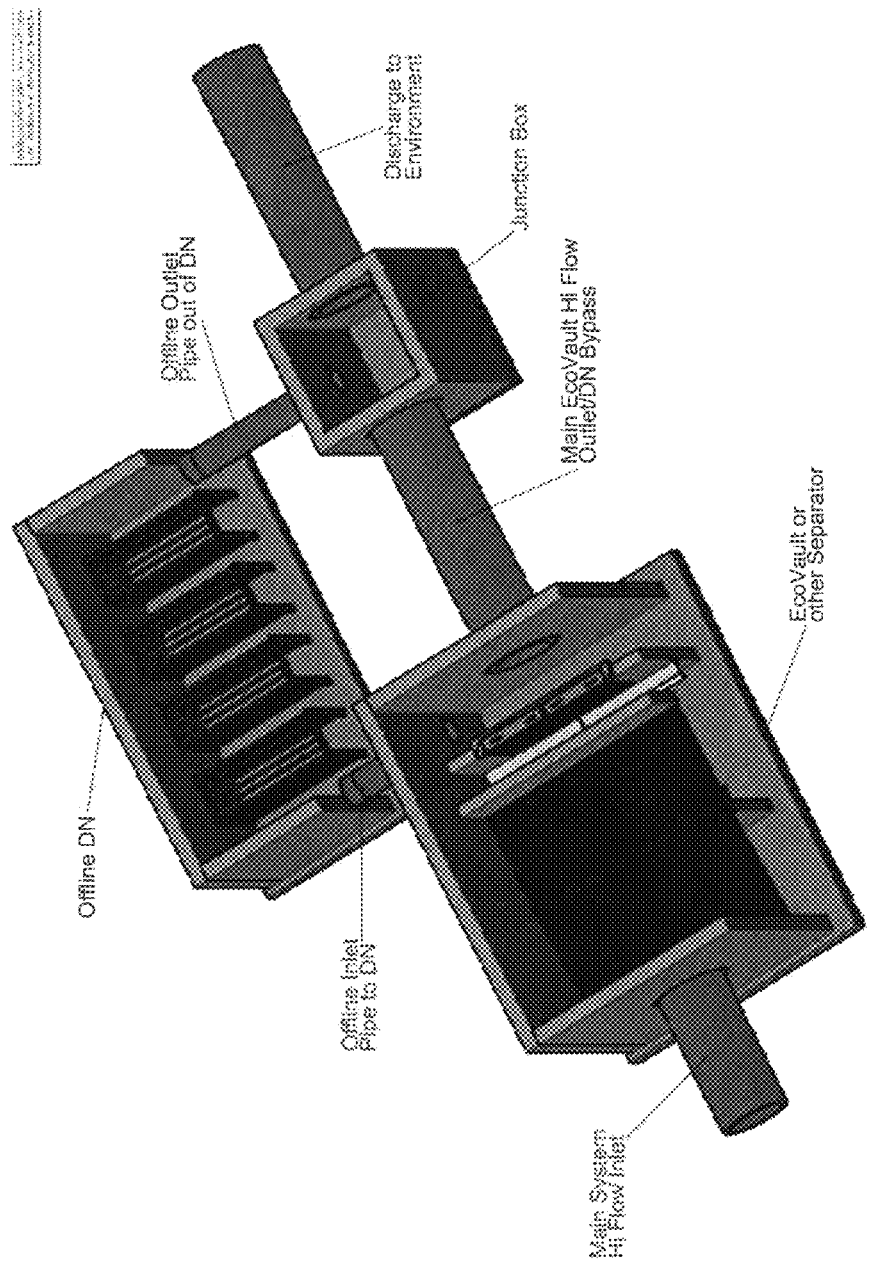
FIG. 7 shows an embodiment of denitrification treatment structure as part of a stormwater treatment system.

FIG. 7 shows an embodiment of denitrification treatment structure as part of a stormwater treatment system. As illustrated, a structure housing the denitrification component, such as, but not limited to, the embodiment shown in FIG. 1, may be located away from a primary stormwater filtration structure to capture nitrates during low flow filtering of water. As also shown in FIG. 1, the DN box may be located as an auxiliary location from the main flow of stormwater through a filtration system.

Figure 8:
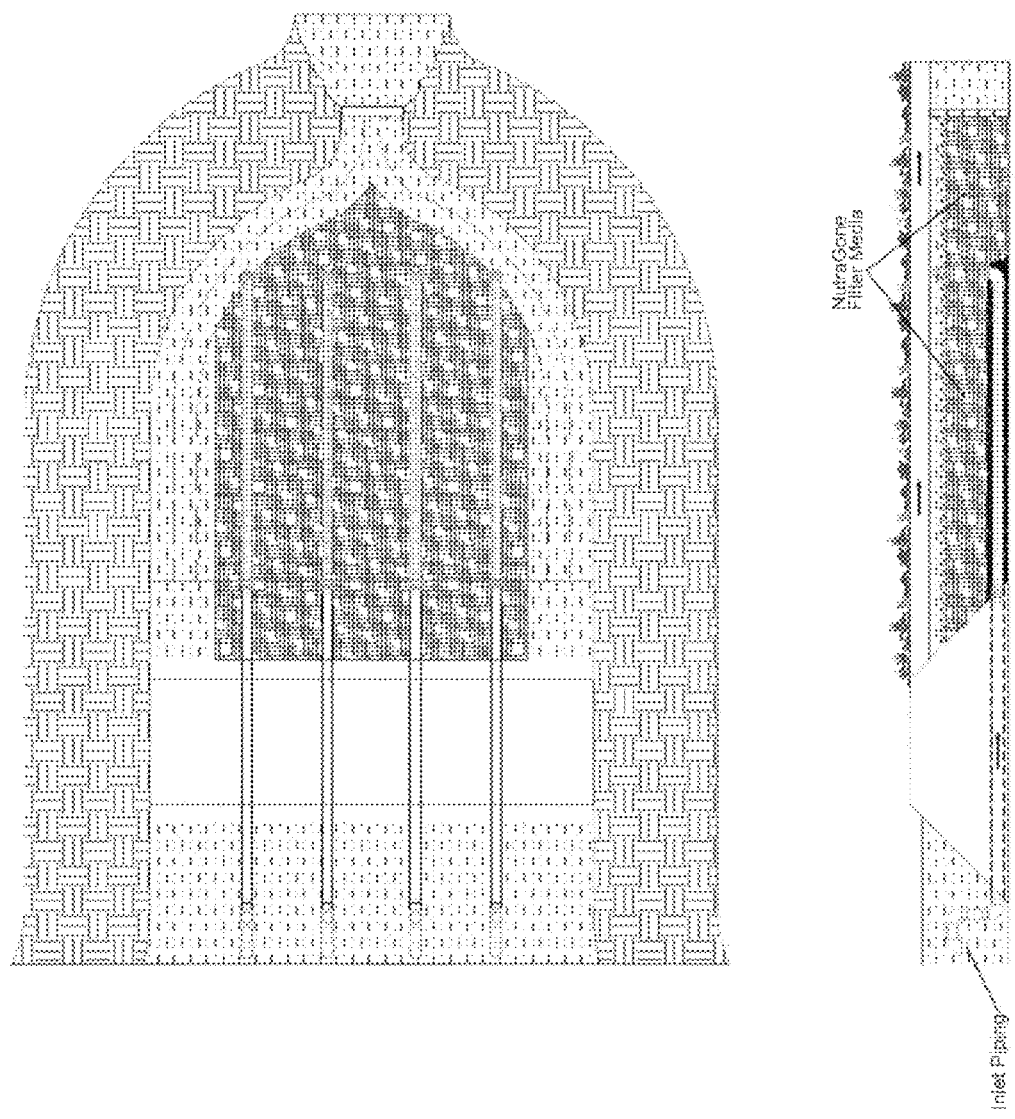
FIG. 8 shows a block diagram of an embodiment of a denitrification treatment system.

FIG. 8 shows a block diagram of an embodiment of a denitrification treatment system. Though embodiments shown above provide for a structure housing that may be manmade, in other embodiments, the structure may be made with dirt or be Earth or soil based. Thus, the type of structure disclosed herein is not limiting. Furthermore, the chamber structure disclosed above may comprise a plurality of arrangements. As such, when dirt is used, a single chamber may be provided which comprises a single compartment within the denitrification treatment system. Thus, the bio media may be arranged within the denitrification treatment system. Therefore, as shown in FIG. 8, a system 800 may comprise a structure 810. The structure 810 may comprise the bio media. The structure 810 may comprise a bottom, and side walls. The side walls may be arranged for water to flow or pass into the structure. An opening may be provided for water to flow out of the structure 810. The out flow may be associated, or formed within at least one side wall, the bottom, or a top cover, if a top cover is provided.

FIG. 9 shows an embodiment of a method. The method 900 comprises passing stormwater into a structure an inflow end and an outflow end, wherein the inflow end and the outflow end may be connected at least one of in-line and off-line of the drain, at 910. The method 900 further comprises denitrifying the stormwater with a bio media consisting of at least two of a naturally formed or occurring zeolite-like material, a naturally formed based carbon source and a biodegradable carbon source, at 920. The method 900 may further comprise removing the stormwater from the structure after denitrifying the stormwater, at 930.

As disclosed above, the naturally formed zeolite-like material may be selected from a group consisting of zeolite and red lava rock. Furthermore, the naturally formed carbon source may be selected from a group consisting of lump coal and biochar. Also, the biodegradable carbon source may be selected from a group consisting of corn cobs, alfalfa based straw and wheat based straw.

The terminology used herein is for the purpose of describing particular embodiments only and is not intended to be limiting. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising." Moreover, unless specifically stated, any use of the terms first, second, etc., does not denote any order or importance, but rather the terms first, second, etc., are used to distinguish one element from another.

Unless otherwise defined, all terms (including technical and scientific terms) used herein have the same meaning as commonly understood by one of ordinary skill in the art to which embodiments of the invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While various disclosed embodiments have been described above, it should be understood that they have been presented by way of example only, and not limitation. Numerous changes, omissions and/or additions to the subject matter disclosed herein can be made in accordance with the embodiments disclosed herein without departing from the spirit or scope of the embodiments. Also, equivalents may be substituted for elements thereof without departing from the spirit and scope of the embodiments. In addition, while a particular feature may have been disclosed with respect to only one of several implementations, such feature may be combined with one or more other features of the other implementations as may be desired and advantageous for any given or particular application. Furthermore, many modifications may be made to adapt a particular situation or material to the teachings of the embodiments without departing from the scope thereof.

Further, the purpose of the foregoing Abstract is to enable the U.S. Patent and Trademark Office and the public generally and especially the scientists, engineers and practitioners in the relevant art(s) who are not familiar with patent or legal terms or phraseology, to determine quickly from a cursory inspection the nature and essence of this technical disclosure. The Abstract is not intended to be limiting as to the scope of the present disclosure in any way.

Therefore, the breadth and scope of the subject matter provided herein should not be limited by any of the above explicitly described embodiments. Rather, the scope of the embodiments should be defined in accordance with the following claims and their equivalents.

I claim:

1. A bio media to remove at least nitrates from collected stormwater, the bio media consisting of:
    approximately 30% to 40% by volume of a naturally formed or occurring zeolite-like material, selected from the group consisting of red lava rock and zeolite;
    approximately 30% to 40% by volume of a naturally formed or occurring carbon source, selected from the group consisting of lump coal, lump charcoal, and biochar; and
    approximately 30 to 40% by volume of a biodegradable carbon source, selected from the group consisting of corn cobs, alfalfa-based straw, and wheat-based straw.

2. The bio media of claim 1, further comprising a structure to hold the bio media.

3. The bio media of claim 1, wherein the naturally formed zeolite-like material is red lava rock.

4. The bio media of claim 1, wherein the naturally formed carbon source is lump charcoal.

5. The bio media of claim 1, wherein the naturally formed or occurring zeolite-like material comprises a framework with cavities and channels within.

6. The bio media of claim 1, wherein the biodegradable carbon source is corn cobs.

7. A baffle box drain system located within a flow stream of a drain, the system comprising:
    a structure comprising:
        an inflow end and an outflow end, wherein the inflow end and the outflow end may be connected at least one of in-line and off-line of the drain;
        a plurality of separation chamber compartments terminating at a base within the structure and an open end at a part of each compartment above the base; and
    a denitrification subsystem located within at least one of the plurality of separation chamber compartments, the denitrification subsystem comprises a bio media consisting of:

approximately 30% to 40% by volume of a naturally formed or occurring zeolite-like material, selected from the group consisting of red lava rock and zeolite;

approximately 30% to 40% by volume of a naturally formed or occurring carbon source, selected from the group consisting of lump coal, lump charcoal, and biochar; and approximately 30 to 40% by volume of a biodegradable carbon source, selected from the group consisting of corn cobs, alfalfa-based straw, and wheat-based straw.

8. A stormwater drainage system, comprising an area into which stormwater passes and a bio media to provide for denitrification of debris within the stormwater, the bio media consisting of:

approximately 30% to 40% by volume of a naturally formed or occurring zeolite-like material, selected from the group consisting of red lava rock and zeolite;

approximately 30% to 40% by volume of a naturally formed or occurring carbon source, selected from the group consisting of lump coal, lump charcoal, and biochar; and approximately 30 to 40% by volume of a biodegradable carbon source, selected from the group consisting of corn cobs, alfalfa-based straw, and wheat-based straw.

9. A method comprising:

passing stormwater into a structure, the structure having an inflow end and an outflow end, wherein the inflow end and the outflow end may be connected at least one of in-line and off-line of a drain; and denitrifying the stormwater with abio media consisting of:

approximately 30% to 40% by volume of a naturally formed or occurring zeolite-like material, selected from the group consisting of red lava rock and zeolite;

approximately 30% to 40% by volume of a naturally formed or occurring carbon source, selected from the group consisting of lump coal, lump charcoal, and biochar; and approximately 30 to 40% by volume of a biodegradable carbon source, selected from the group consisting of corn cobs, alfalfa-based straw, and wheat-based straw.

10. The method according to claim 9, further comprising removing the stormwater from the structure after denitrifying the stormwater.

* * * * *